(No Model.)

J. H. ROSE.
TWINE GUIDE AND TENSION DEVICE FOR HARVESTERS.

No. 356,377. Patented Jan. 18, 1887.

WITNESSES
F. L. Ourand
Edward Stanton

John H. Rose,
INVENTOR
By Louis Bagger & Co
Attorneys.

UNITED STATES PATENT OFFICE.

JOHN H. ROSE, OF PRAIRIE DU SAC, WISCONSIN.

TWINE GUIDE AND TENSION DEVICE FOR HARVESTERS.

SPECIFICATION forming part of Letters Patent No. 356,377, dated January 18, 1887.

Application filed April 10, 1886. Serial No. 198,487. (No model.)

*To all whom it may concern:*

Be it known that I, JOHN H. ROSE, a citizen of the United States, and a resident of Prairie du Sac, in the county of Sauk and State of Wisconsin, have invented certain new and useful Improvements in Twine-Regulators for Harvester-Binders; and I do hereby declare that the following is a full, clear, and exact description of the invention, which will enable others skilled in the art to which it appertains to make and use the same, reference being had to the accompanying drawings, which form a part of this specification, and in which—

Figure 1:
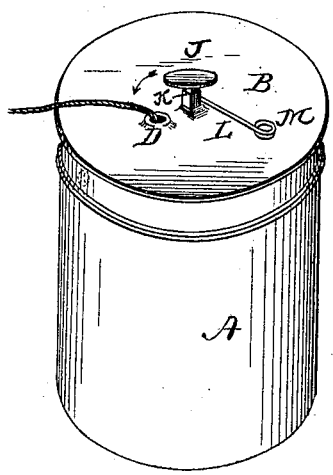
Figure 2:
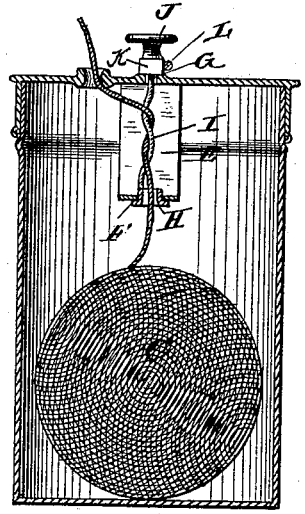
Figure 3:
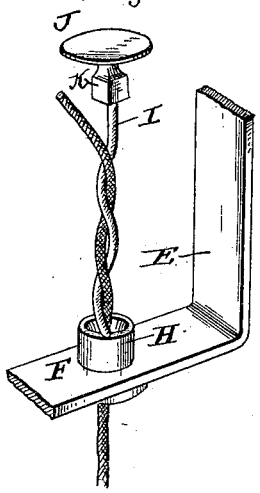
Figure 4:
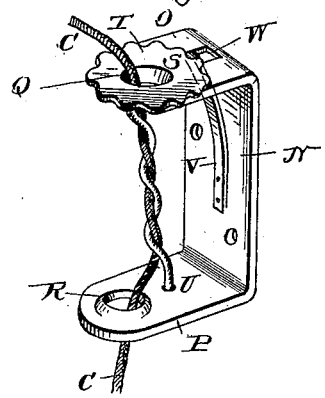

Figure 1 is a perspective view of the twine-box of a self-binding harvester provided with my improved device. Fig. 2 is a vertical sectional view of the same. Fig. 3 is a perspective detail view of the device, and Fig. 4 is a similar view of a modification of the same.

Similar letters of reference indicate corresponding parts in all the figures.

My invention has relation to devices for taking out the twist of the twine used in self-binding harvesters; and it consists in the improved construction and combination of parts of such a device, as hereinafter more fully described and claimed.

In self-binding harvesters using twine great trouble and annoyance is caused by the twine in the twine-box becoming twisted and snarled by the pinching of the tension device, thus preventing the twine from coming freely out of the box, and causing the portion of the twine within the box to be twisted very tightly, while the twine on leaving the box will be almost untwisted, and consequently weakened. To avoid these difficulties, I have constructed a device consisting of a wire twisted into steep spirals, running in the opposite direction to the original twist of the twine. Around this wire is carried the twine, it being guided to and from the spiral by eyes at the ends of the wire. As the twine passes through this device its normal twist is slightly loosened between the device and the ball, thereby preventing any snarling of it in the box, but as the twine leaves the spiral it has a firmer twist than before it leaves the ball.

In the accompanying drawings, the letter A indicates the twine-box, which box may be of any suitable construction, and which box is provided with a removable lid or cover, B, provided with a perforation, D, which may either be directly in the top of the cover, as shown in full lines in the drawings, or in the side of the box, as shown in the dotted lines, according to the construction of the machine in which the box or receptacle is used.

The ball C of twine is placed within this box or receptacle, and the under side of the cover of the box is provided with a bail or frame, E, formed with a perforation, F, in the middle of its lower end, which perforation is in a vertical line with a perforation, G, in the center of the cover.

In the perforation F is fitted a bushing, H, which is adapted to rotate in said perforation, and to whose upper end is secured the wire I, which forms the twine-guide and tension-coil. This wire is twisted into a permanent rigid steep spiral, and has a button or handle, J, provided with a square shank, K, secured to its upper end, which passes freely through the perforation G in the cover of the box.

The free end of a wire, L, bears against the side of the square shank, and the inner end of this wire is formed with a coil, M, and is secured to the top of the cover.

When the binder is in operation, the twine is carried from the ball through the sleeve or bushing at the lower end of the wire, and passed out through the discharge-aperture to the knotting mechanism. By revolving the wire by means of the button and retaining it in its adjusted position by the spring bearing against the square shank of the button, the twine is coiled one or more times around the spirals of the wire. Then, as the twine is drawn out of the box it has a tendency to untwist when unwinding from the ball; but as it passes up around the spiral its strands become more firmly twisted together than before it left the ball.

In Fig. 4 of the drawings is shown a slight modification of the device, which may be secured to the side or top of any twine-box, and which consists of a frame or plate, N, which may be secured to the box in any suitable manner, and which is formed with two lips, O and P, each having a perforation, Q and R.

A bushing, S, having its rim formed with equidistant notches T, is fitted in the perforation of the lip upon the outside of the twine-box, to the inner side of which is secured the upper end of the coiled wire. The lower end of the wire is loosely secured and turns in a perforation, U, in the lower lip directly in a line with the perforation in the upper lip. A spring, V, is secured at one end to the inner side of the plate, and has its free end projecting through a slot, W, in the lip having the bushing, engaging the notches in the bushing. This is only an inverted form of the device having a different method of securing it in place, and its operation is the same as the other, so that by revolving the bushing the twine may be carried around the wire and the bushing will be held in its proper position by the spring engaging the notches in the same.

The device may be subjected to other changes for the purpose of adapting it to twine boxes or receptacles of different constructions, and the means for securing the wire and for revolving it may be subjected to changes without departing from the spirit of my invention, the main and essential point in the invention being the spiral wire guiding the twine.

Having thus described my invention, I claim and desire to secure by Letters Patent of the United States—

1. A twine guide and tension device for self-binding harvesters, consisting of a wire twisted into steep spirals, and means, substantially as described, for revolving it and holding it at any place, as and for the purpose shown and set forth.

2. A twine guide and tension device for self-binding harvesters, consisting of a wire twisted into steep spirals, and having a bushing or sleeve at one end, and means for revolving it and holding it, as and for the purpose shown and set forth.

3. A twine guide and tension device for self-binding harvesters, consisting of a piece of wire twisted into steep spirals in the opposite direction to the twist of the twine, and having a sleeve or bushing at the end toward the ball, and means for revolving and adjusting it, as and for the purpose shown and set forth.

4. In a twine guide and tension device for self-binding harvesters, the combination of the twine-box having a removable cover, formed with an outlet-aperture, a frame projecting from the under side of the cover and having a perforation in the center of its lower end piece registering with the central aperture in the cover, a wire twisted into steep spirals in the opposite direction to the twist of the twine, and having its lower end provided with a bushing revolving in the perforation of the frame, and having its upper end revolving in the aperture in the lid, and having a square-shanked button secured upon its upper end above the cover, and a spring secured to the cover and bearing with its free end against the square shank of the button, as and for the purpose shown and set forth.

5. In a twine guide and tension device for self-binding harvesters, the combination of a twisted wire journaled with its upper end in the cover of the twine-box, and having a button at its upper end formed with a square shank, with a spring secured at one end to the cover, and bearing with the other end against the square shank, as and for the purpose shown and set forth.

In testimony that I claim the foregoing as my own I have hereunto affixed my signature in presence of two witnesses.

JOHN H. ROSE.

Witnesses:
THOMAS BAKER,
CHRISTIAN ROSE.